(12) United States Patent
Chen

(10) Patent No.: US 9,694,786 B1
(45) Date of Patent: Jul. 4, 2017

(54) VEHICLE SECURITY SYSTEM INCLUDING INDICATOR TO WINDSHIELD ANTENNA UNIT

(71) Applicant: Yan Jun Chen, Taipei (TW)

(72) Inventor: Yan Jun Chen, Taipei (TW)

( * ) Notice: Subject to any disclaimer, the term of this patent is extended or adjusted under 35 U.S.C. 154(b) by 0 days.

(21) Appl. No.: 14/985,410

(22) Filed: Dec. 31, 2015

(51) Int. Cl.
*B60R 25/10* (2013.01)
*B60R 25/20* (2013.01)

(52) U.S. Cl.
CPC .............................. *B60R 25/2009* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,710,745 A | * | 12/1987 | del Rosario | B60R 25/018 340/332 |
| 5,038,133 A | * | 8/1991 | Martin | B60R 25/018 307/10.8 |
| 5,861,801 A | * | 1/1999 | Cullen | B60R 25/018 307/10.2 |

* cited by examiner

*Primary Examiner* — Travis Hunnings

(57) ABSTRACT

A vehicle security device antenna LED status indicator, matching the host of a vehicle security system installed inside a vehicle, said antenna unit including: a circuit structure with relevant electronic components such as a wireless transceiver; an LED to display the received signal and usage status, electrically connected to the circuit structure; and a light-guiding structure, corresponding and abutting to the LED, with the end of the light-guiding structure away from the LED bonded with a light hood; the antenna light unit is attached to the windshield at the place behind the internal rearview mirror. When the anti-theft system of the vehicle is activated, the antenna light unit will distinctively indicate that the vehicle is under the anti-theft status.

1 Claim, 4 Drawing Sheets

VEHICLE SECURITY SYSTEM INCLUDING INDICATOR TO WINDSHIELD ANTENNA UNIT

BACKGROUND OF INVENTION

1. Field of the Invention

The present invention relates generally to a vehicle security device, and more particularly to a vehicle security device antenna LED status indicator which provides distinct warning visual effect.

2. Description of Related Art

Generally, a vehicle security system installed in a vehicle has a vehicle security host. In case of movement, destruction or theft, the buzzer will emit a warning noise to warn and deter the theft.

With a common exposed anti-theft lock (e.g. gear lock, steering wheel lock etc.), the thief can immediately know that the vehicle is using a vehicle security device. However, in most cases, the lock can merely delay the time for the thief to steal the vehicle, it cannot provide a really effective anti-theft function; moreover, for most vehicle owners, they rely on the built-in vehicle security system provided by the vehicle manufacturer for basic vehicle security. Such a vehicle security system is hidden inside the vehicle. People other than the owner or professionals may not know the exact location of the system. Hence, for the thief, it is more difficult to steal the vehicle. However, theft is still unavoidable, because the owner may forget to activate the vehicle security system due to neglect. From outside of the vehicle, it is hard to identify the vehicle is under armed status or not. If not, the thief can easily steal the vehicle.

In consideration of this, the inventor of the present invention made great effort in the research and design of an improved system to overcome the above shortcomings, so that the vehicle security device can provide a distinct warning visual effect when the vehicle is under Arm mode status, which can effectively warn and deter the theft, the vehicle is under security system protection.

SUMMARY OF THE INVENTION

The main objective of the present invention is to provide a vehicle security device antenna light unit that can enhance the warning and anti-theft effects, reduce the possibility of theft, and consequently prevent crimes.

To fulfill the above objective, the inventor altered the antenna unit in the vehicle security system into a totally new antenna status indicating unit. Inside the housing of the antenna light unit, the configurations include: a circuit structure with relevant electronic components such as a wireless transceiver; an LED to display the received signal and indicate the status of system, which is electrically connected to the circuit structure; and a light-guiding structure to correspond to the LED. One end of the light-guiding structure is bonded with a light hood, so as to condense and guide the light emitted by the LED and project it on the light hood.

The above light-guiding structure has an introduction end and an emitting end for light transmission. On the periphery of the introduction end, there are two corresponding convex blocks, and on the emitting end, there is a concave reflection surface.

The beneficial effect of the present invention is: when the vehicle security installed inside the vehicle is activated and the vehicle is under Arm mode, the LED of the antenna unit will continuously emit flash light, the light will be projected on the light hood after transmission, refraction and reflection, and then there will be an evenly lighted area. When seeing from outside of the vehicle, the visual effect of the bright lighted area can remind that the vehicle is under Arm mode. This can help reduce the possibility of theft.

DETAILED DESCRIPTION OF THE INVENTION

Figure 1:
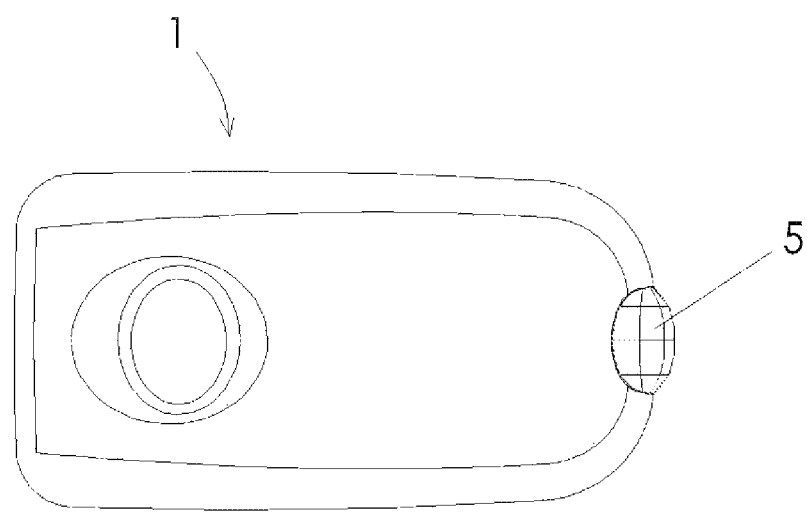
FIG. 1 is an outside view of the present invention of a vehicle security device antenna LED status indicator.

Firstly, referring to FIG. 1, the present invention of a vehicle security device antenna LED status indicator is matched to the host of the security system and configured inside the vehicle, in most cases on the windshield the antenna LED status indicator 1 has a matching housing 10, inside the housing 10, there are at least configurations of: a circuit structure 2 with relevant electronic components such as a wireless transceiver; an LED 3 to display the received signal and usage status, the LED 3 being electrically connected to the circuit structure 2; and a light-guiding structure 4, with its one end corresponding and abutting to the LED 3, and the end of the light-guiding structure 4 away from the LED 3 is bonded with a light hood 5, so that the light emitted by the LED 3 will be projected on the light hood 5 after transfer, refraction and reflection, and finally form a diffused light, and create a bright lighted area.

Figure 2:
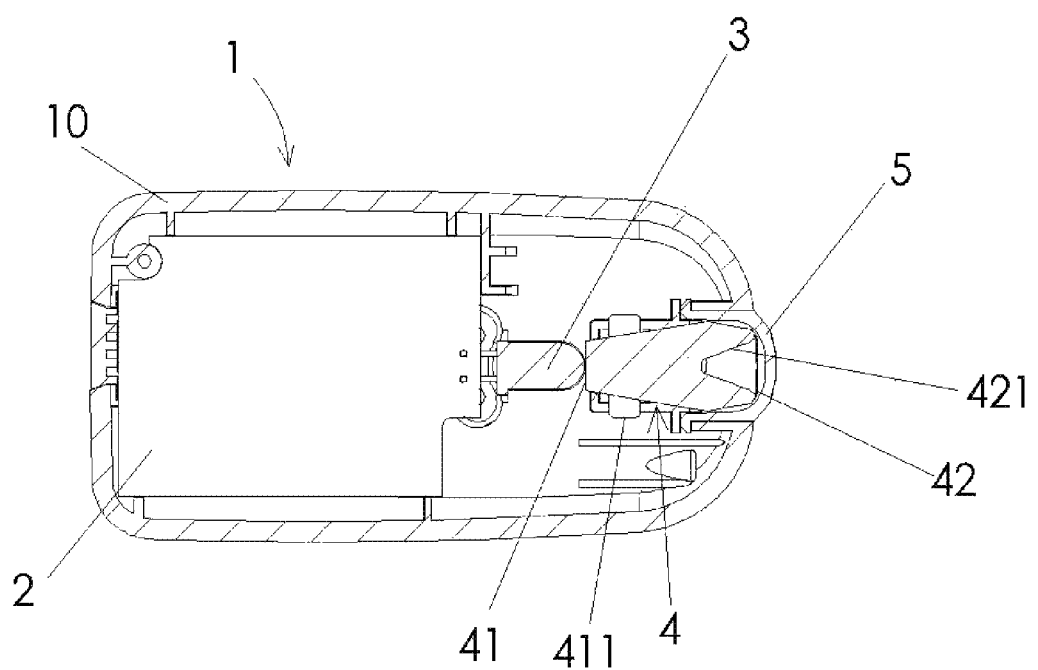
FIG. 2 is an exploded structural view of the present invention of a vehicle security device antenna LED status indicator.
Figure 3:
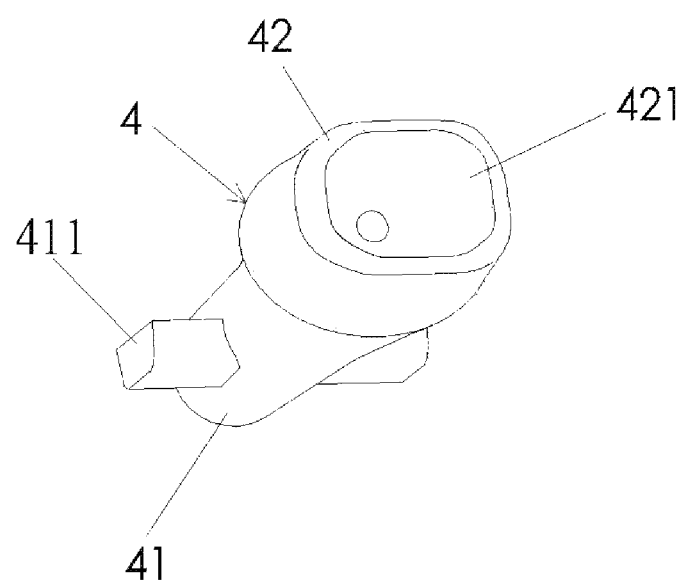
FIG. 3 is a schematic view of the light-guiding structure of the present invention of a vehicle security device antenna LED status indicator.

Referring to the outside view of the light-guiding structure shown in FIGS. 2 and 3, the light-guiding structure 4 has an introduction end 41 to transfer the light and an emitting end 42, the periphery of the introduction end 41 is configured with two corresponding convex blocks 411, so that the light-guiding structure 4 can stably fixed and positioned on the inner wall of the housing 10 of the antenna light unit 1, the emitting end 42 has a concave reflection surface 421, so that the transferred light includes transmitted light and reflected light; the light hood 5 is fixed on the inner edge of the housing 10 of the antenna light unit 1, completely covering the emitting end of the light-guiding structure 4. An opening is configured on the edge of the housing 10 so that part of the tip of the light hood 5 smaller than the diameter of the opening can extend out of the opening.

The main function of the light-guiding structure 4 is to let in the light emitted by the LED 3 from the introduction end 41, transfer the main transmitted and reflected lights and send them out from the emitting end 42, meanwhile, through the reflection surface 42, part of the reflection light is formed, and then, through refraction by the light hood 5, the emitted light is translated from the original form of one light "spot" into a form of one light "area" with a specific range.

Figure 4:
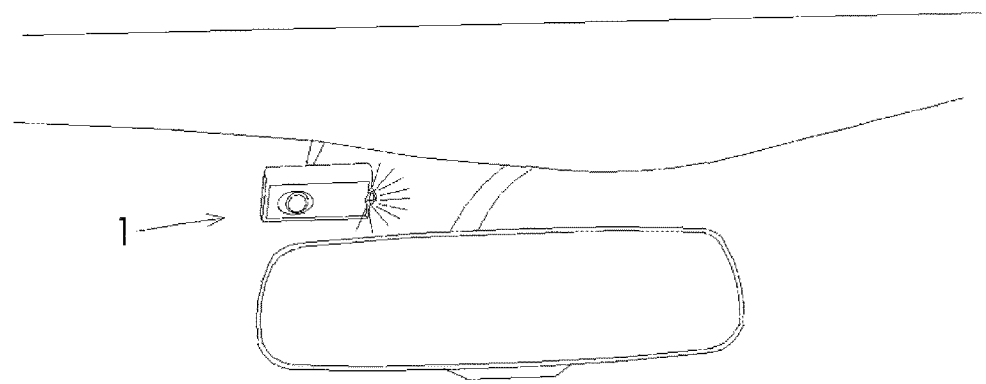
FIG. 4 is an implementation state view of the present invention of a vehicle security device antenna LED status indicator.

Referring to the implementation state view shown in FIG. 4, in actual installation, the antenna LED status indicator 1 matching the host of the anti-theft system is configured on the windshield. The installation can be done simply by absorption or adhesion. Normally, this position can avoid blocking or interference of the antenna signal, and can provide easier implementation of the present invention to accomplish the expected purpose and effect.

In operation, the driver uses a vehicle security remote controller to activate the vehicle security system. Upon receiving the order signal from the vehicle security remote controller, the antenna LED status indicator 1 will cause the LED 3 to emit a slow flashing light, and the vehicle security system enters the warning status; in case a thief intends to breaks into the vehicle, because the antenna light unit 1 is located at an easily discovered position, and with the bright flashing light "area", the thief will easily know that the vehicle is currently under Arm mode status. The intention of the thief and possibility of theft can be reduced. Hence, the invention can prevent theft.

To summarize, the embodiment of the present invention can really accomplish the expected object and effect. And up till now, there have been no publicly known disclosures or products with similar structures and features. Hence, the present invention meets the prerequisites for patent application and the inventor submitted an application in accordance with the relevant law.

The invention claimed is:

1. A vehicle security device antenna LED status indicator which comprising an antenna unit housing which enclosing:
   a circuit structure;
   a wireless transceiver;
   a LED for displaying signals and status, which is electrically connected to the circuit structure;
   a light-guiding structure, which is corresponding and abutting to the LED for transferring light and refract part of said light; and
   a light hood bonded with the end of said light-guiding structure away from the LED; wherein,
   said light-guiding structure is provided with an introduction end and an emitting end, the periphery of the introduction end is provided with two corresponding convex blocks, and the emitting end is provided with a concave reflection surface.

* * * * *